(12) United States Patent
Burns et al.

(10) Patent No.: US 12,044,348 B2
(45) Date of Patent: Jul. 23, 2024

(54) VEHICLE BODY STRUCTURE

(71) Applicant: NISSAN NORTH AMERICA, INC., Franklin, TN (US)

(72) Inventors: Tyler Clayton Burns, Farmington Hills, MI (US); Matthew Pottebaum, Canton, MI (US); Tyler Richard Heaven, Northville, MI (US); Stephen William Baluch, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 349 days.

(21) Appl. No.: 17/515,376

(22) Filed: Oct. 29, 2021

(65) Prior Publication Data

US 2023/0132719 A1 May 4, 2023

(51) Int. Cl.
*F16L 57/00* (2006.01)
*B60K 13/04* (2006.01)
*F16L 57/06* (2006.01)
*F16L 58/00* (2006.01)

(52) U.S. Cl.
CPC ............ *F16L 57/005* (2013.01); *B60K 13/04* (2013.01); *F16L 57/06* (2013.01); *F16L 58/00* (2013.01)

(58) Field of Classification Search
CPC ... B60K 13/04; F01N 13/082; F01N 2510/08; F16L 57/005; F16L 58/00
USPC ........................................................ 296/1.07
See application file for complete search history.

(56) References Cited

U.S. PATENT DOCUMENTS

| | | | | |
|---|---|---|---|---|
| 3,495,673 | A * | 2/1970 | Diran ................. | B62D 25/2036 280/848 |
| 5,170,020 | A * | 12/1992 | Kruger .................. | F01N 13/082 181/227 |
| 7,007,720 | B1 * | 3/2006 | Chase ..................... | F16L 59/12 181/227 |
| 9,346,350 | B2 * | 5/2016 | Nowka ................... | F01N 13/08 |
| 10,072,555 | B2 * | 9/2018 | Kiryu ..................... | F01N 13/082 |
| 10,590,828 | B2 * | 3/2020 | Köhnlein .............. | F01N 13/082 |
| 2014/0124283 | A1 * | 5/2014 | Novacek ................ | B60K 13/04 180/309 |
| 2021/0115835 | A1 * | 4/2021 | Diehl .................... | F01N 13/1855 |

* cited by examiner

*Primary Examiner* — Jason S Daniels
(74) *Attorney, Agent, or Firm* — Global IP Counselors, LLP (57) ABSTRACT

A vehicle body structure includes an exhaust component, a pipe extending from the exhaust component and a water shield. The water shield has a first end fixed to the pipe at a location proximate the exhaust component. The water shield extends rearward from the location proximate the exhaust component and has a second end that is spaced apart from the pipe.

14 Claims, 8 Drawing Sheets

FIG. 17

VEHICLE BODY STRUCTURE

BACKGROUND

Technical Field

The present disclosure generally relates to vehicle body structure. More specifically, the present disclosure relates to vehicle body structure that includes an exhaust component and tail pipe with a water shield attached to the tail pipe in order to direct water from above the tail pipe away from the tail pipe.

BACKGROUND INFORMATION

Exhaust gases traveling through an exhaust system of a vehicle can get very hot when the vehicle is operating. It is advantageous to limit and/or prevent water from contacting all elements of the exhaust system.

SUMMARY

It has been discovered that in to prevent water from contacting a tail pipe of a vehicle when it rains, it is advantageous to provide the tail pipe with a water shield that deflects water away from the tail pipe.

In view of the state of the known technology, one aspect of the present disclosure is to provide a vehicle body structure with an exhaust component, a pipe extending from the exhaust component and a water shield. The water shield has a first end fixed to the pipe at a location proximate the exhaust component. The water shield extends rearward from the location proximate the exhaust component and has a second end that is spaced apart from the pipe.

Another aspect of the present disclosure is to provide a vehicle body structure with a rear panel of a vehicle, an exhaust component, a pipe and a water shield. The rear panel at least partially defines a rear opening. The exhaust component is attached to a lower rear section of the vehicle. The pipe is attached to the exhaust component and extends from the exhaust component under the rear panel. The water shield has a first end fixed to the pipe at a location proximate the exhaust component and a second end that extends under the rear panel of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 that includes an exhaust component 12 with a water shield 14 (FIGS. 5-6 and 8-17) is illustrated in accordance with an exemplary embodiment.

In the depicted exemplary embodiment, the vehicle 10 is, for example, an SUV (sports utility vehicle). However, the vehicle 10 can be any of a variety of vehicle designs that include a trunk opening or rear hatch opening and an exhaust system.

Figure 1:
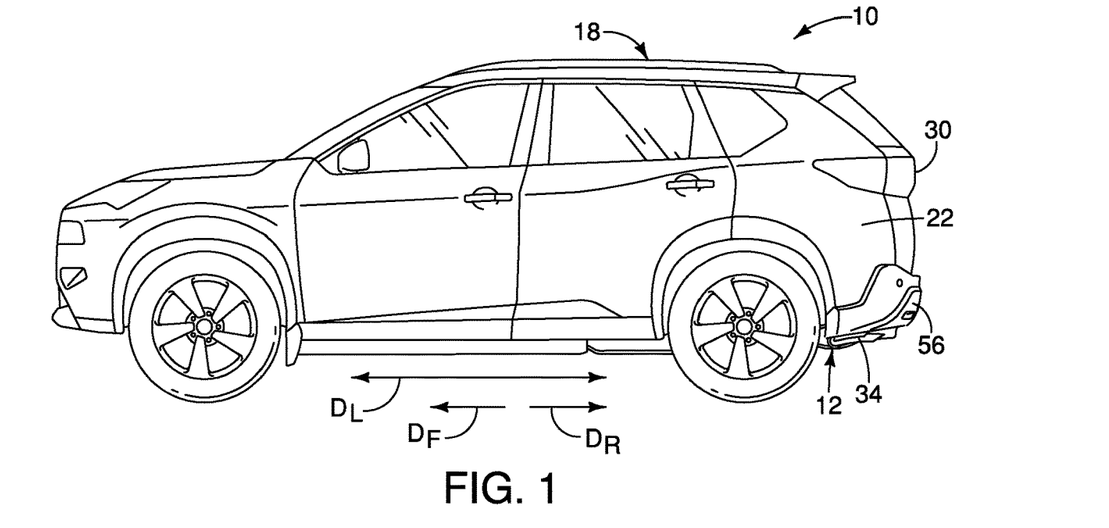
FIG. 1 is a side view of a vehicle that includes a vehicle body structure having an exhaust component installed to a rear lower section of the vehicle body structure in accordance with an exemplary embodiment.
Figure 2:
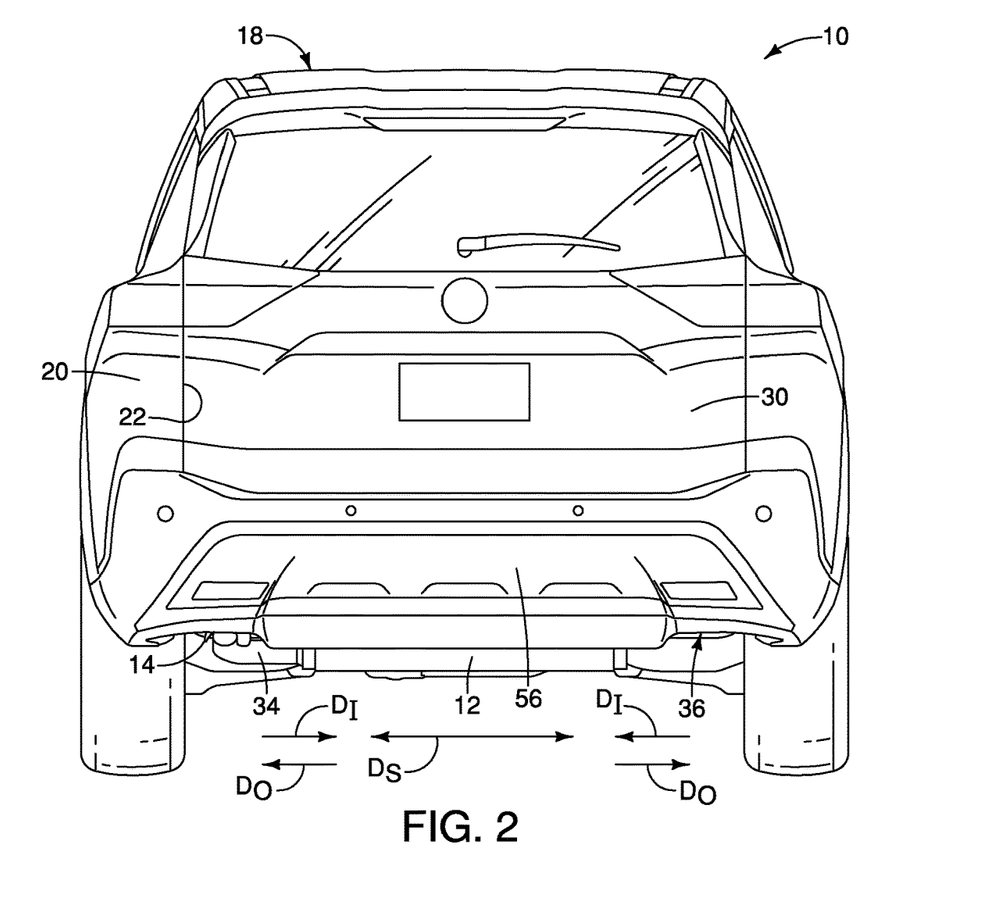
FIG. 2 is a rear view of the vehicle showing a rear hatch door in a closed orientation with the exhaust component installed to the rear lower section of the vehicle body structure with a tail pipe extending rearward from the exhaust component in accordance with the exemplary embodiment.
Figure 3:
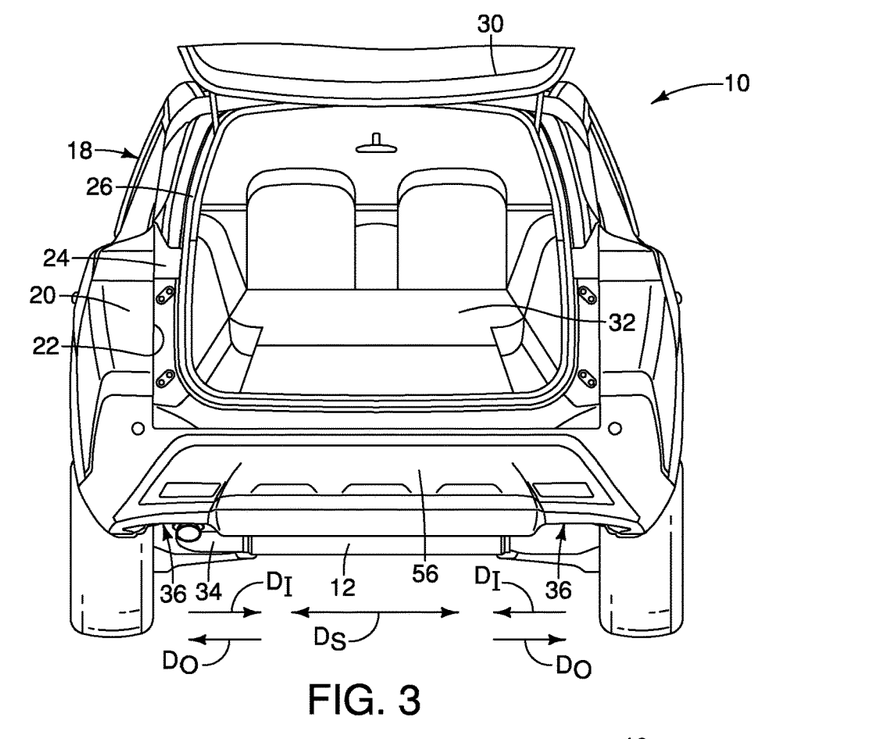
FIG. 3 is another rear view of the vehicle showing the rear hatch door in an open orientation exposing drainage sections of the vehicle body structure defined adjacent to opposite sides of a rear opening with the tail pipe extending rearward from the exhaust component beneath one of the drainage sections in accordance with the exemplary embodiment.
Figure 5:
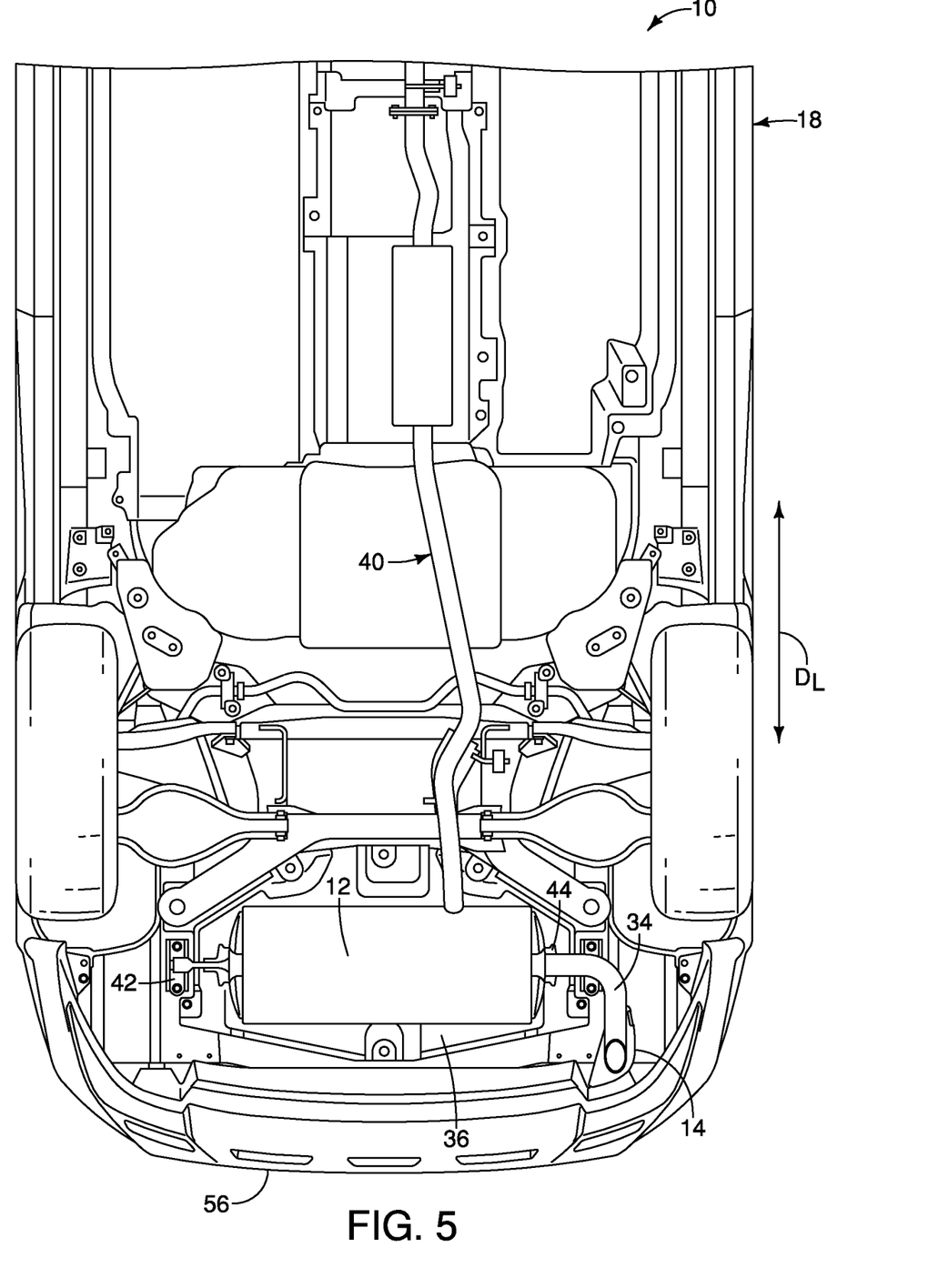
FIG. 5 is a bottom view of the vehicle body structure showing an exhaust system installed to an underside of the vehicle body structure with the exhaust component installed to the rear lower section and the tail pipe extending rearward from one lateral side of the exhaust component in accordance with the exemplary embodiment.

Several directions are defined by the vehicle 10, such as a vehicle longitudinal direction $D_L$, a vehicle forward direction $D_F$ and a vehicle rearward direction DR, as shown in FIG. 1, an inboard direction $D_I$, an outboard direction Do and a vehicle lateral direction $D_S$ (a vehicle side-to-side direction), as shown in FIGS. 2-3 and 5.

Figure 6:
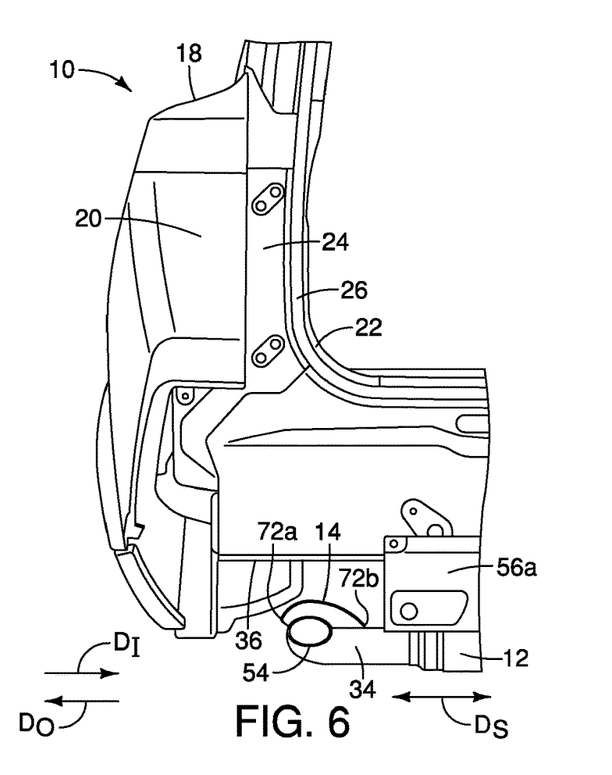
FIG. 6 a rear view of a lower outboard area of the vehicle body structure showing one of the drainage sections of the vehicle body structure with the tail pipe extending rearward from the exhaust component beneath the depicted drainage section with the water shield installed to the tail pipe shielding the upper surface of the tail pipe such that when it is raining the water shield diverts rain water flowing downward along the drainage section away from the tail pipe in accordance with the exemplary embodiment.

In the exemplary embodiment, the vehicle 10 has a vehicle body structure 18 that includes a rear panel 20 that defines a rear opening 22 (FIGS. 3 and 6). The rear panel 20 also defines vertical drainage sections 24 located on opposite sides of the rear opening 22. A seal 26 is installed to seal retaining structures (not shown), such as flanges (not shown) such that the seal 26 basically surrounds the rear opening 22. The drainage section 24 basically defines an edge of the rear opening 22 of the vehicle 10 with portions of the seal 26 extending between the rear opening 22 and the drainage sections 24.

Figure 4:
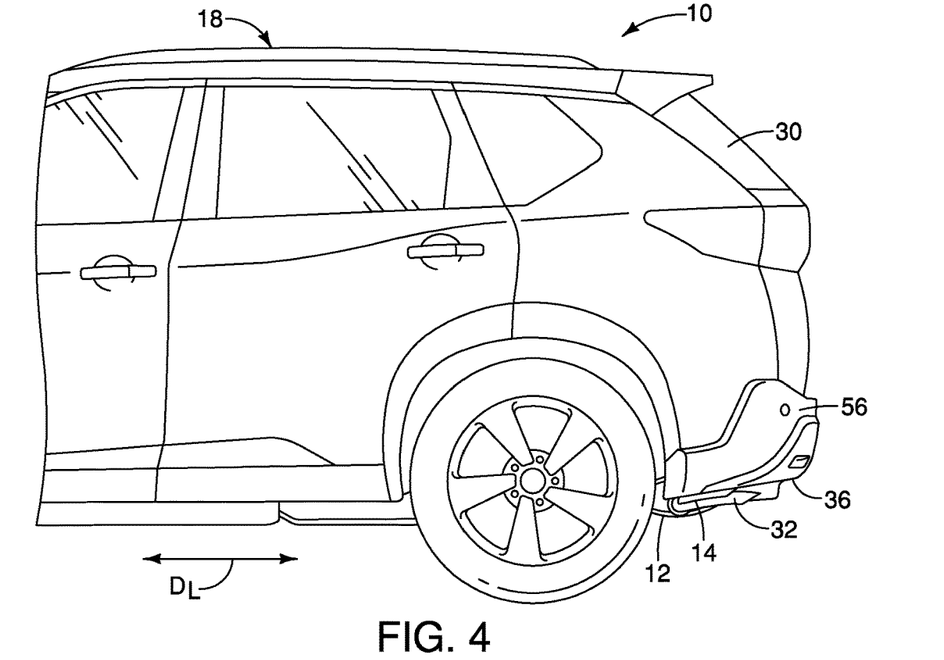
FIG. 4 is another side view of the vehicle showing the tail pipe extending rearward from the exhaust component installed to the rear lower section of the vehicle body structure in accordance with the exemplary embodiment.

The vehicle body structure 18 further includes a rear hatch door 30 that is movable between a closed orientation (FIGS. 1, 2 and 4, and an open orientation (FIGS. 3 and 6). When the rear hatch door 30 is in the closed position, the rear hatch door 30 contacts the seal 26 preventing water from entering the rear opening 22 and entering a cargo area 32 defined within the vehicle body structure 18. Further, when the vehicle 10 is exposed to large amounts of water, such as a steady or hard rain, the seal 26 ensures that water to flow down along the vertical drainage sections 24 (also referred to as the drainage section 24) to locations below the vehicle 10, thereby preventing water from flowing into the rear opening 22.

The vehicle body structure 18 also defines a rear lower section 36, as shown in FIG. 5. An exhaust system 40 is installed to the vehicle body structure 18 of the vehicle 10. The exhaust system 40 extends from an engine (not shown) located at the front of the vehicle 10 to the rear lower section 36 of the vehicle body structure 18. The exhaust component 12 is installed to predetermined locations of the rear lower section 36 of the vehicle body structure 18. The exhaust component 12 is oriented such that it extends in the vehicle lateral direction Ds, as shown in FIG. 5.

The exhaust component 12 are installed to the rear lower section 36 via, for example, a first hanger assembly 42 and a second hanger assembly 44, as shown in FIG. 5. The first and second hanger assemblies 42 and 44 are conventional structures. Further description of the first and second hanger assemblies 42 and 44 is therefore omitted for the sake of brevity. A rear pipe 34 is fixed to the exhaust component 12 beneath the second hanger 44 at one lateral end of the exhaust component 12. The rear pipe 34 includes a curved portion 50 and a rearwardly extending portion 52 that includes an open end 54. The curved portion 50 is welded or otherwise rigidly fixed to the exhaust component 12 and curves rearward such that the portion 52 of the rear pipe 34 is located below a rear bumper assembly 56 of the vehicle 10 and exhausts gases to the rear of the vehicle 10.

The exhaust component 12 can be a muffler or resonator of the exhaust system 40 but is preferably a muffler. The exhaust system 12 includes a plurality of conventional components. Since the components of the exhaust system 40 are conventional exhaust system components, further description is omitted for the sake of brevity.

A description of the water shield 14 is now provided with specific reference to FIGS. 6-17.

As shown in FIG. 6, the water shield 14 and the rear pipe 34 are located below the vertical drainage section 24. In FIG. 6, a fascia cover of the rear bumper assembly 56 has been removed showing only an energy absorbing member 56a of the rear bumper assembly 56.

When rain falls on the vehicle 10, water is diverted away from the rear opening 22 by the seal 26 such that water is channeled to move along the vertical drainage sections 24 on either side of the rear opening 22. One of the drainage sections 24 is located above the water shield 14 and the rear pipe 34 (also referred to as a tail pipe or the pipe 34). Water flowing downward from the drainage section 24 can make its way between the rear bumper assembly 56 and the rear panel 20 such that some of the rainwater flows can flow onto the rear pipe 34 in the absence of the water shield 14. The water shield 14 is installed to the rear pipe 34 in order to divert the rainwater away from the rear pipe 34.

The water shield 14 includes a first end 60, a mid-section 62 and a second end 64. The first end 60 of the water shield 14 includes welding zones 68a and 68b. The welding zone 68a is located along an outboard side of the first end 60 of the water shield 14. The welding zone 68b is located along an inboard side of the first end 60 of the water shield 14. The welding zones 68a and 68b can be indentations formed in the water shield 14. The water shield 14 also defines an upper surface 70a and a lower surface 70b. In the depicted embodiment, the indentations with flattened areas that define the welding zones 68a and 68b are concaved along the upper surface 70a and are convex along the lower surface 70b, as shown in FIGS. 10-17.

The first end 60 of the water shield 14 is attached to the rear pipe 34 (the tail pipe) at a forward end of the rearwardly extending portion 52 proximate the curved portion 50 and proximate the exhaust component 12. In the depicted embodiment, the welding zones 68a and 68b are dimensioned such that they mate and firmly contact the rear pipe 34 during assembly. The first end 60 of the water shield 14 is welded to the rear pipe 34 at the welding zones 68a and 68b. The contact between the welding zones 68a and 68a define attachment locations such that the second end 64 of the water shield 14 is spaced apart from the open end 54 of the rear pipe 34. Further, the second ends 64 of the water shield 14 extends under the rear panel 20 of the vehicle 10 and under one of the drainage sections 24.

Figure 7:
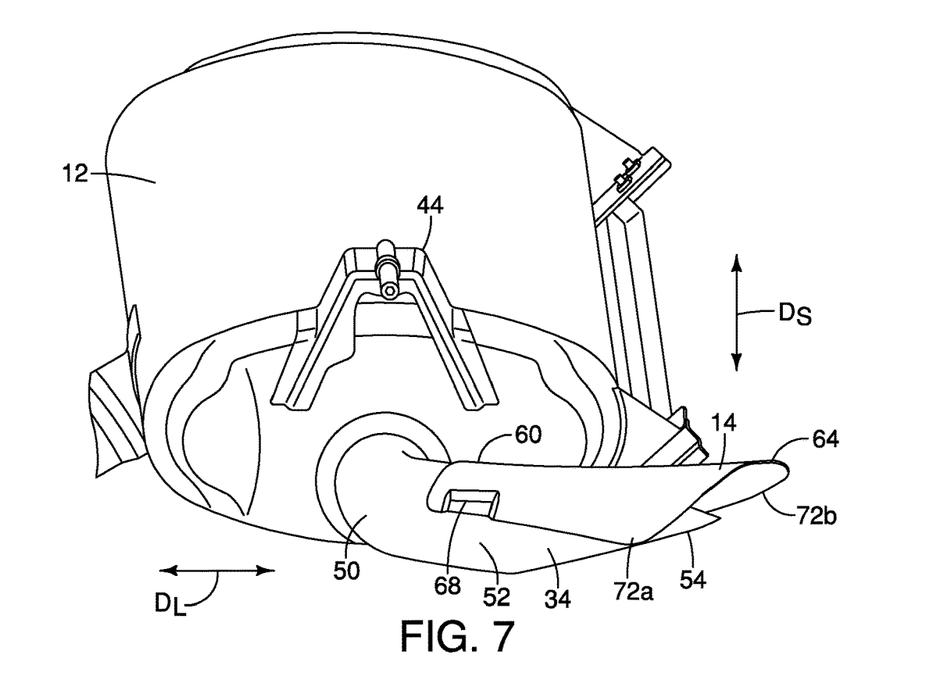
FIG. 7 is a perspective view of the exhaust component and the tail pipe removed from the vehicle showing the water shield attached to the tail pipe in accordance with the exemplary embodiment.
Figure 8:
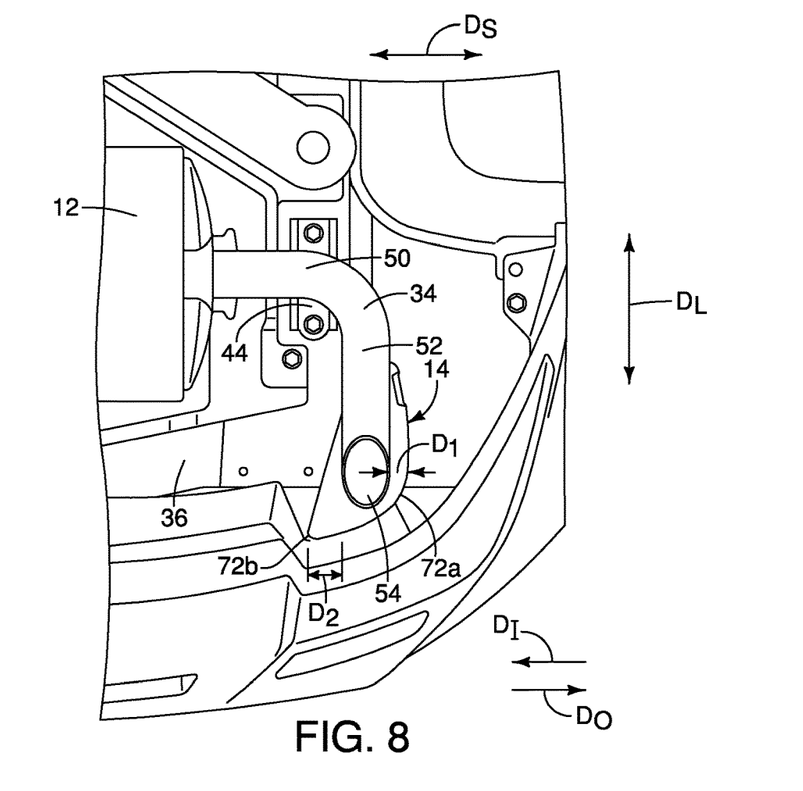
FIG. 8 is another bottom view of the vehicle body structure showing a portion of the rear lower section of the vehicle body structure with the exhaust component attached thereto and with the water shield attached to the tail pipe in accordance with the exemplary embodiment.
Figure 9:
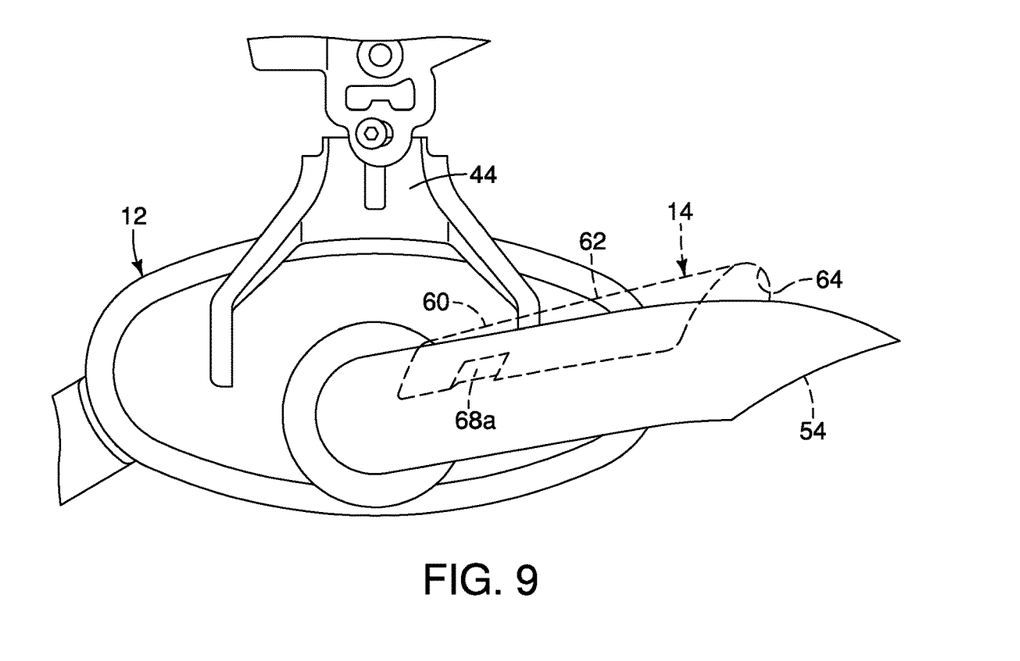
FIG. 9 is a side view of the exhaust component and tail pipe with the water shield depicted in phantom showing the orientation of the tail pipe relative to the exhaust component in accordance with the exemplary embodiment.
Figure 10:
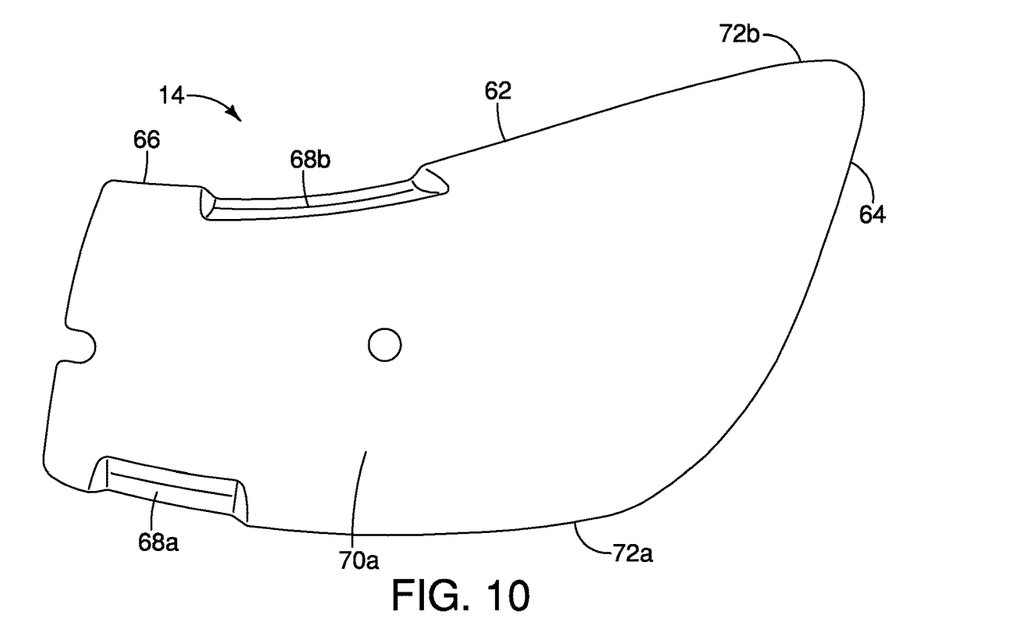
FIG. 10 is a top view of the water shield removed from the tail pipe showing an upper surface of the water shield with a first end that includes welding zones, a mid-section and a second end in accordance with the exemplary embodiment.
Figure 11:
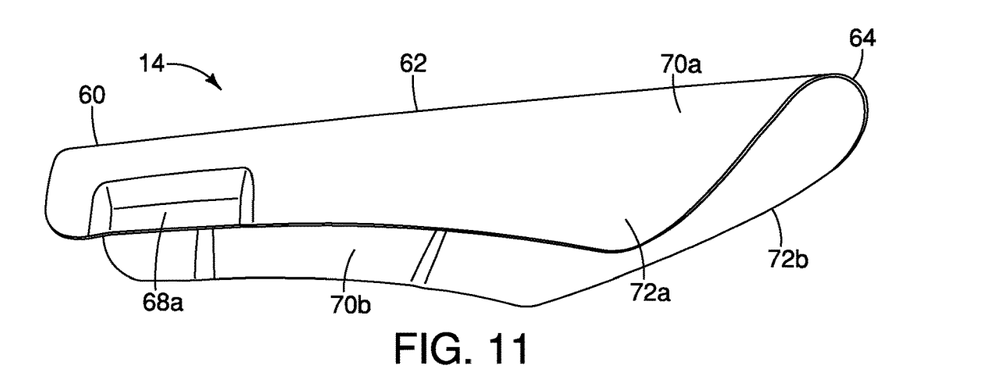
FIG. 11 is an outboard side perspective view of the water shield showing a portion of the upper surface of the water shield, a portion of a lower surface of the water shield and the welding zones in accordance with the exemplary embodiment.
Figure 12:
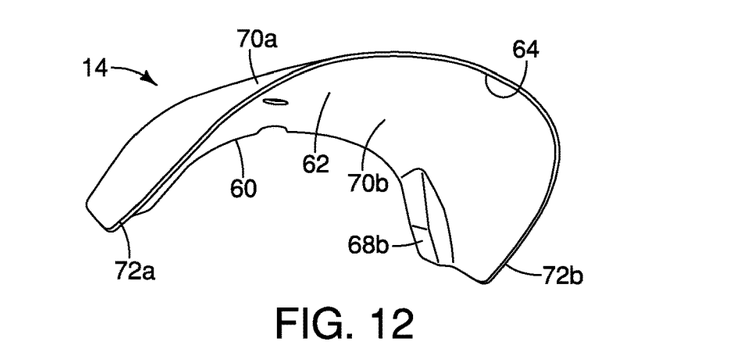
FIG. 12 is a rear perspective view of the water shield showing a portion of the upper surface of the water shield, the lower surface of the water shield and one of the welding zones in accordance with the exemplary embodiment.
Figure 13:
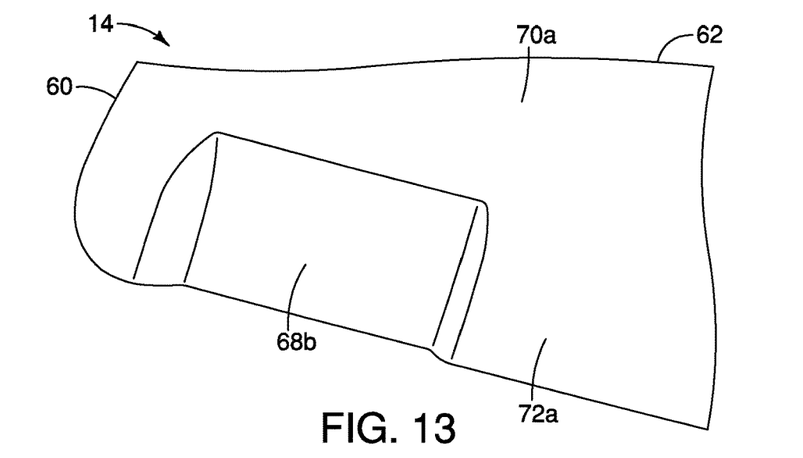
FIG. 13 is a partial outboard side view of the first end of the water shield showing one of the welding zones in accordance with the exemplary embodiment.
Figure 14:
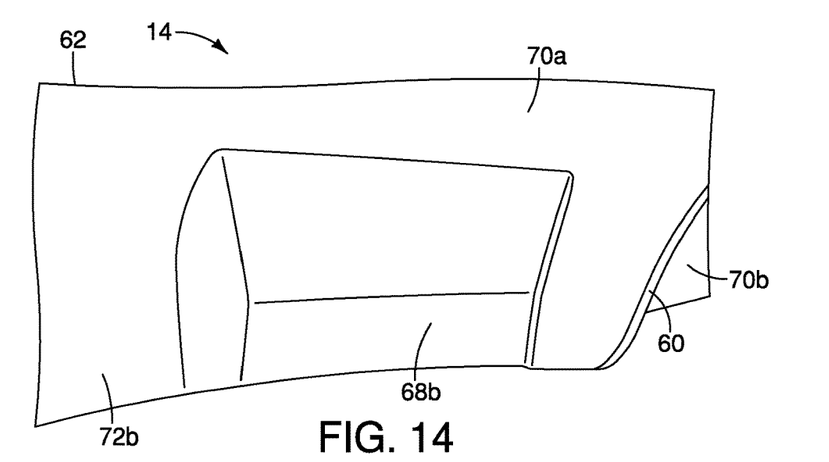
FIG. 14 is a partial inboard side view of the first end of the water shield showing the other of the welding zones in accordance with the exemplary embodiment.
Figure 15:
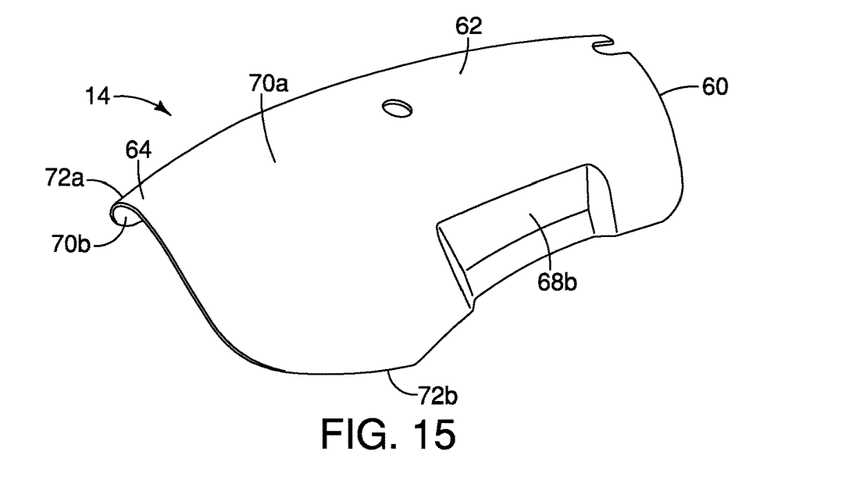
FIG. 15 is a perspective view of the water shield showing the upper surface and the other of the welding zones in accordance with the exemplary embodiment.
Figure 16:
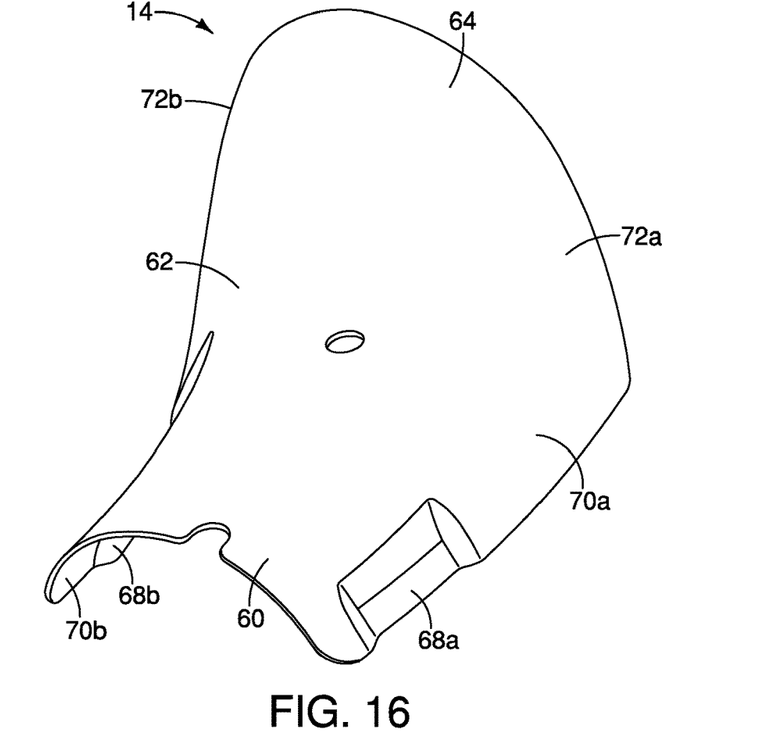
FIG. 16 is a rear perspective view of the water shield showing the upper surface and the one of the welding zones in accordance with the exemplary embodiment.
Figure 17:
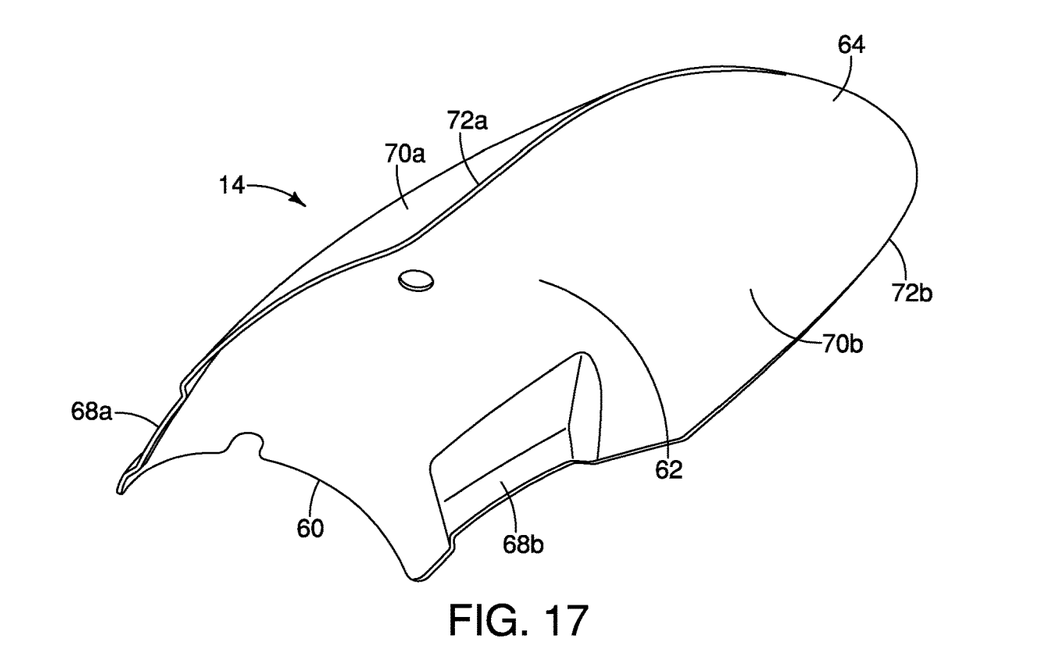
FIG. 17 is a perspective view of the water shield showing the lower surface and the welding zones in accordance with the exemplary embodiment.

As shown in FIGS. 10, the mid-section 62 of water shield 14 is curved as it extends from the first end 60 to the second end 64. The second end 64 defines an outboard end portion 72a and an inboard end portion 72b. As shown in FIGS. 6 and 8, the outboard end 72a is a first distance $D_1$ away from the open end 54 of the rear pipe 34 and the inboard end portion 72b is a second distance $D_2$ away from the open end 54 of the rear pipe 34, with the second distance $D_2$ being greater than the first distance $D_1$. Further, as shown in FIGS. 6 and 7, the water shield 14 diverges away from the rear pipe 34 moving from the welding zones 68a and 68b toward the mid-section 62 and open end 54 of the rear pipe 14. This, the mid-section 62 and second end 64 of the water shield 14 are spaced apart from the rear pipe 14.

Further, the water shield 14 has a curved contour that is shaped to direct water away from the rear pipe 14. Further, as viewed in FIGS. 12 and 16, the water shield 14 has a partial conical shape that directs water away from the rear pipe 34.

The features and elements (other than the water shield 14, rear pipe 34 and the exhaust component 12) are conventional components that are well known in the art. Since these features and elements are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
an exhaust component;
a pipe extending from the exhaust component; and
a water shield having a first end fixed to the pipe at a location proximate the exhaust component, the water shield extending rearward from the location proximate the exhaust component and having a second end that is spaced apart from the pipe, and the water shield has a partial conical shape that directs water away from the pipe.

2. The vehicle body structure in accordance with claim 1, wherein
the water shield includes a mid-section that extends from the first end to the second end, the mid-section and the pipe being offset from one another such that the mid-section diverges away from the pipe in a direction from the first end and toward the second end of the pipe.

3. The vehicle body structure in accordance with claim 2, wherein
the water shield has a curved contour shaped to direct water away from the pipe.

4. The vehicle body structure in accordance with claim 1, wherein
the water shield includes welding zones formed thereon for attachment to the pipe.

5. The vehicle body structure in accordance with claim 1, further comprising
a vehicle having a rear lower section, with the exhaust component being installed to the lower rear section of the vehicle such that the water shield is located beneath a rear side area that at least partially defines a rear opening of the vehicle.

6. A vehicle body structure comprising:
an exhaust component;
a pipe extending from the exhaust component; and
a water shield having a first end fixed to the pipe at a location proximate the exhaust component, the water shield extending rearward from the location proximate the exhaust component and having a second end that is spaced apart from the pipe, the water shield including welding zones formed thereon for attachment to the pipe, and
the welding zones of the water shield are flattened areas defined along lower edges thereof dimensioned for mating with an exterior surface portion of the tail pipe.

7. A vehicle body structure comprising:
a rear panel of a vehicle that at least partially defines a rear opening;
an exhaust component that is attached to a lower rear section below the rear panel of the vehicle;
a pipe attached to the exhaust component and extending from the exhaust component under the rear panel; and
a water shield having a first end fixed to the pipe at a location proximate the exhaust component and a second end that extends under the rear panel of the vehicle, and the water shield having a partial conical shape that directs water away from the pipe.

8. The vehicle body structure in accordance with claim 7, wherein the water shield has a second end that is spaced apart from the pipe.

9. The vehicle body structure in accordance with claim 8, wherein
the water shield includes a mid-section that extends from the first end to the second end, the mid-section and the pipe being offset from one another such that the mid-section diverges away from the pipe in a direction from the first end and toward the second end of the pipe.

10. The vehicle body structure in accordance with claim 7, wherein
the water shield has a curved contour shaped to direct water away from the pipe.

11. The vehicle body structure in accordance with claim 7, wherein
the water shield includes welding zones formed thereon for attachment to the pipe.

12. The vehicle body structure in accordance with claim 7, wherein
the exhaust component is installed to a rear lower area of a vehicle such that the water shield is located beneath an edge of a rear opening of the vehicle.

13. The vehicle body structure in accordance with claim 7, wherein
the rear opening exposes a cargo area within the vehicle.

14. A vehicle body structure comprising:
a rear panel of a vehicle that at least partially defines a rear opening;
an exhaust component that is attached to a lower rear section below the rear panel of the vehicle;
a pipe attached to the exhaust component and extending from the exhaust component under the rear panel; and
a water shield having a first end fixed to the pipe at a location proximate the exhaust component and a second end that extends under the rear panel of the vehicle, the water shield includes welding zones formed thereon for attachment to the pipe, and
the welding zones of the water shield are flattened areas defined along lower edges thereof dimensioned for mating with an exterior surface portion of the tail pipe.

* * * * *